United States Patent
Park et al.

(10) Patent No.: US 9,914,417 B2
(45) Date of Patent: Mar. 13, 2018

(54) DEVICE AND METHOD FOR PREVENTING DISCHARGE OF EMERGENCY CALL (ECALL) SYSTEM BACKUP BATTERY

(71) Applicant: Hyundai Motor Company, Seoul (KR)

(72) Inventors: Chan Seok Park, Gwangmyeong-si (KR); Min Cheol Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 699 days.

(21) Appl. No.: 14/480,176

(22) Filed: Sep. 8, 2014

(65) Prior Publication Data
US 2015/0165991 A1 Jun. 18, 2015

(30) Foreign Application Priority Data
Dec. 17, 2013 (KR) .................. 10-2013-0156856

(51) Int. Cl.
*B60R 16/033* (2006.01)
(52) U.S. Cl.
CPC .................. *B60R 16/033* (2013.01)
(58) Field of Classification Search
CPC . B60R 16/033; H04B 1/38; G08B 1/00; H02J 7/00
See application file for complete search history.

(56) References Cited

U.S. PATENT DOCUMENTS

| | | | |
|---|---|---|---|
| 6,977,612 B1 * | 12/2005 | Bennett | B60R 25/102 342/357.46 |
| 7,657,374 B2 * | 2/2010 | Kamiya | B60R 21/0134 340/436 |
| 7,868,742 B2 * | 1/2011 | Shimizu | G08B 25/016 340/309.16 |
| 2004/0075345 A1 * | 4/2004 | Yoshioka | G08B 25/016 307/66 |
| 2008/0129547 A1 | 6/2008 | Shinoda | |
| 2009/0024659 A1 * | 1/2009 | Deshpande | G06F 17/3056 |

(Continued)

FOREIGN PATENT DOCUMENTS

| | | |
|---|---|---|
| CN | 101261761 A | 9/2008 |
| CN | 103338986 A | 10/2013 |
| JP | 2000-322677 A | 11/2000 |

(Continued)

*Primary Examiner* — Jared Fureman
*Assistant Examiner* — Michael Warmflash
(74) *Attorney, Agent, or Firm* — McDermott Will & Emery LLP

(57) ABSTRACT

A device for preventing an eCall system backup battery for a vehicle from discharging is provided. The device includes a GPS configured to provide current position information of the vehicle in which an eCall system is mounted. A sales area information storage is configured to form and store the GPS information on all sales areas as a sales area information database. A microcomputer is configured to determine whether the vehicle is located within a sales area which is a final destination by using the information acquired from the GPS module and the sales area information storage and to control whether the backup battery operates depending on the determination result. A power supply manager is configured to select and manage any one of a main battery and the backup battery as supply power of the eCall system by a control of the microcomputer.

15 Claims, 3 Drawing Sheets

(56) References Cited

U.S. PATENT DOCUMENTS

2011/0163718 A1* 7/2011 Van Wiemeersch .. B60R 16/033
 320/109
2013/0249279 A1* 9/2013 Sogabe ................... B60R 16/03
 307/9.1

FOREIGN PATENT DOCUMENTS

| JP | 2000-341196 A | 12/2000 |
| JP | 2007-079950 A | 3/2007 |
| JP | 2008-207604 A | 9/2008 |
| JP | 2008-207714 A | 9/2008 |
| JP | 4887702 B2 | 2/2012 |

* cited by examiner

DEVICE AND METHOD FOR PREVENTING DISCHARGE OF EMERGENCY CALL (ECALL) SYSTEM BACKUP BATTERY

CROSS-REFERENCE TO RELATED APPLICATION

This application claims under 35 U.S.C. § 119(a) the benefit of priority to Korean Patent Application No. 10-2013-0156856 filed in the Korean Intellectual Property Office on Dec. 17, 2013, the entire contents of which are incorporated herein by reference.

TECHNICAL FIELD

The present disclosure relates to a device and a method for preventing a discharge of an emergency call (eCall) system backup battery for a vehicle. More particularly, the present disclosure relates to a device and a method for preventing an eCall system backup battery for a vehicle from discharging so as to operate the eCall system when a main battery for the vehicle is discharged.

BACKGROUND

An emergency call (eCall) system senses a collision at the time of a car accident and automatically transmits situation information including positional information of the car accident to relevant authorities through an emergency phone, thereby reducing a response time to the accident.

The eCall system automatically calls a relevant center when receiving an air bag unfolding signal of an air bag control unit (ACU) at the time of the accident and informs the relevant centers of the accident. The eCall system has a mobile communication modem embedded therein and interconnects with a microphone, a speaker, and the like of the vehicle.

The eCall system includes buttons for a user to manually request or test an 'eCall' service, a light-emitting diode (LED) to display an operation state, and the like. Further, the eCall system includes an auxiliary battery (backup battery) so as to be operated even when the vehicle is turned off and/or, a main battery is damaged or separated at the time of the accident.

The eCall system receives power from the main battery of the vehicle. When the main battery is damaged or separated, the eCall system receives power from the backup battery. Thus, the backup battery needs to supply power to operate the eCall system for a set period. In the case in which the eCall system is not operated by the backup battery, the eCall system informs the user through the LED or the like for backup battery replacement.

When exporting a vehicle, it requires a long-term transportation period to a sales region. Here, the main battery of the eCall system and the vehicle are separately transported to prevent them from discharging, and the backup battery embedded in the eCall system may be operated and thus may be discharged, such that the eCall system may not be able to be operated by the backup battery at the time of an accident, or the backup battery may need to be replaced at the time of the vehicle sales.

The existing eCall system generally monitors the main battery voltage and receives power from the backup battery when t the main battery voltage drops to a threshold voltage or less, so as to prevent the backup battery from unnecessarily discharging before the sales of a vehicle (or during transportation or storage).

However, the existing eCall system may not monitor main battery voltage when the main battery is separated from the vehicle, such that the user cannot manually operate or test the eCall system under a vehicle turned-off state.

Therefore, the existing eCall system does not prevent the backup battery from discharging during the transportation prior to the vehicle sale. Therefore, the backup battery may need to be replaced prior to delivering the vehicle to a customer, and when an accident occurs prior to the backup battery replacement, the eCall system may not operate.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a device and a method for preventing an eCall system backup battery for a vehicle from discharging which may occur when a vehicle is transported.

According to an exemplary embodiment of the present disclosure, a device for preventing an emergency call (eCall) system backup battery for a vehicle from discharging is provided The device includes a global positioning system (GPS) configured to provide current position information of the vehicle in which an eCall system is mounted. A sales area information storage is configured to form and store the GPS information on all sales areas as a sales area information database. A microcomputer is configured to determine whether the vehicle is located within a sales area which is a final destination by using the information acquired from the GPS and the sales area information storage and controls whether the backup battery operates depending on the determination result. A power supply manager is configured to select and manage any one of a main battery and the backup battery to supply power to the eCall system by a control of the microcomputer.

When the vehicle is located within the sales area which is the final destination, the microcomputer may control the backup battery of the eCall system to be in an operable state.

When the vehicle is not located within the sales area which is the final destination, the microcomputer may maintain the backup battery of the eCall system to be in an inoperable state even though the main battery is in an operable state.

The power supply manager may be a switch which connects any one of the main battery and the backup battery to the eCall system by the control of the microcomputer.

The power supply manager may include a switch which connects any one of the main battery and the backup battery to the eCall system by the control of the microcomputer and a backup battery controller which forcibly interrupts a connection between the backup battery and the switch by the control of the microcomputer.

The sales area information database may include each sales area information on a plurality of sales areas which are formed by dividing the whole region including all the sales areas into N predetermined regions, and the respective sales area information may include GPS information on central points and all corners of each of the sales areas which is divided into a quadrangular shape or the respective sales area information may include the GPS information or radius values on the central points of each of the sales areas which is divided into a circular shape.

According to another exemplary embodiment of the present disclosure, a method for preventing an eCall system backup battery for a vehicle from discharging is provided. The method includes determining whether power from a main battery is supplied. Current position information of the vehicle and sales area information on a final destination of the vehicle are acquired when it is recognized that the power from the main battery is supplied. It is determined whether the vehicle is located within a sales area based on a comparison result of the acquired current position information of the vehicle with the sales area information on the final destination of the vehicle. The backup battery of the eCall system is controlled in an operable state when the vehicle is located within the sales area which is the final destination.

When the vehicle is not located within the sales area which is the final destination, the microcomputer may maintain the backup battery of the eCall system to be in an inoperable state even though the main battery is in the operable state.

In the step of acquiring, the sales area information on the final destination of the vehicle may be acquired from the sales area information database, the sales area information database may be each sales area information on a plurality of sales areas which are formed by dividing the whole region including all the sales areas into N predetermined regions.

The backup battery may supply power to the eCall system when the main battery for supplying power to the eCall system is not operated and may be initially set in an inoperable state.

According to the device and the method for preventing an eCall system backup battery for a vehicle from discharging, it is possible to prevent the unnecessary exchange of the backup battery by preventing the backup battery from discharging for a long period of time when the vehicle is being transported, and it is possible to secure user convenience by being automatically performed without the user operation.

Other aspects and preferred embodiments of the disclosure are discussed infra.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed in further detail below.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
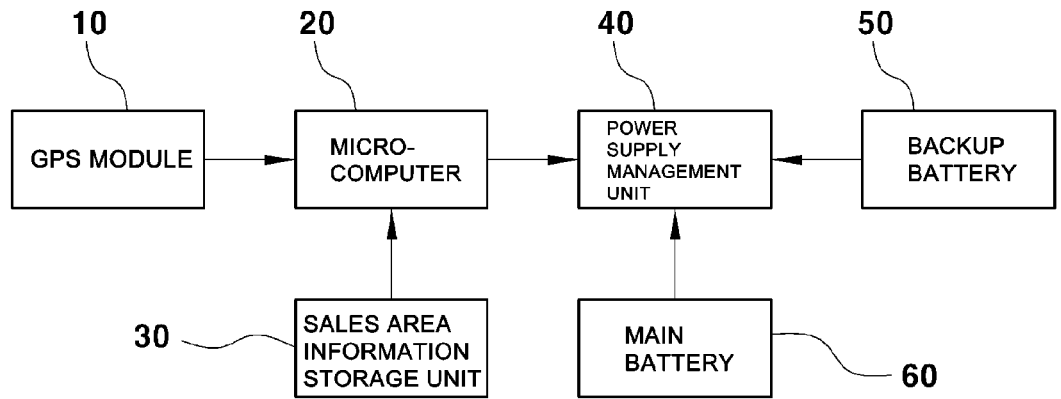
FIG. 1 is a diagram for describing a configuration of a device for preventing an emergency call (eCall) system backup battery for a vehicle from discharging according to an exemplary embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the present disclosure will be described to be performed by a person having ordinary skill in the art to which the present disclosure pertains.

The present disclosure is directed to preventing an auxiliary battery (backup battery) embedded in an emergency call (eCall) system from being operated for a long period of time when a vehicle is transported to a sales area in the state in which a main battery is separated from the vehicle after vehicle production. Therefore, the present disclosure may operate the backup battery when the vehicle is delivered to a sales area to prevent the backup battery from unnecessarily discharging, and thus, the backup battery is not operated beforehand.

As illustrated in FIG. 1, a device for preventing an eCall system backup battery of for a vehicle from discharging according to an exemplary embodiment of the present disclosure includes a global positioning system (GPS) 10, a microcomputer 20, a sales area information storage 30, a power supply manager 40, a backup battery 50, and a main battery 60.

The GPS 10 interconnects with a satellite to provide vehicle position information and receives a signal transmitted from a GPS satellite to provide current position information of the vehicle.

When the microcomputer 20 recognizes that the main battery 60 supplies power to the eCall system, the microcomputer 20 acquires the current position information of the vehicle from the GPS 10 and uses a sales area information database to determine whether the current position of the vehicle is included in a sales area. The microcomputer 20 controls whether the backup battery 50 is operated (used) depending on a comparison result of the current position information of the vehicle with the sales area information database.

The sales area information storage 30 stores the GPS information on all the sales areas and transmits the sales area information to the microcomputer 20 when requested by the microcomputer 20. The sales area information storage 30 divides all the sales areas into N number of regions to database and store central points and boundaries of each sales area. Herein, this operation is performed by the microcomputer 20.

That is, the microcomputer 20 configures the sales area information database in advance and stores the configured sales area information database in the sales area information storage 30 and requests the stored sales area information database if it is necessary to acquire the information from the sales area information storage 30. For example, the microcomputer 20 divides a region including all the sales areas into the N number of regions and stores the GPS information on each of the divided regions in the sales area information storage 30.

The power supply manager 40 manages power supplied to the eCall system by the control of the microcomputer 20 to supply the power from the backup battery to the eCall system or supply the power from the main battery to the eCall system based on a control signal of the microcomputer 20. In detail, the power supply manager 40 maintains the backup battery 50 to be in an enable state or a disable state by the control of the microcomputer 20. When the main battery 60 does not operate due to separation or the like, the power supply manager 40 supplies the power from the backup battery 50 to the eCall system.

For example, the power supply manager 40 may include a switch 41 which connects any one selected from the backup battery 50 and the main battery 60 to the eCall system by the control of the microcomputer 20. In this case, the switch 41 supplies the power from the selected battery to the eCall system.

Figure 2:
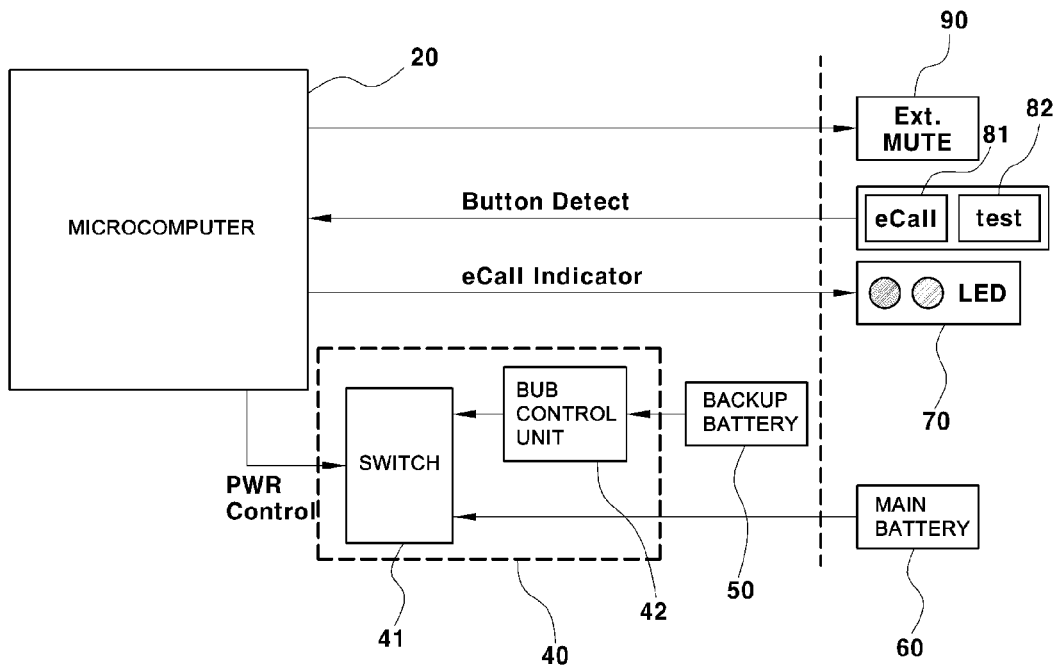
FIG. 2 is a diagram for describing a configuration and an operation method of a device for preventing an eCall system backup battery for a vehicle from discharging according to an exemplary embodiment of the present disclosure.

As another example, as illustrated in FIG. 2, the power supply manager 40 may include the switch 41 which connects any one of the backup battery 50 and the main battery 60 to the eCall system by the control of the microcomputer 20 and a backup battery controller 42 which may forcibly interrupt the connection between the backup battery 50 and the switch 41 by the control of the microcomputer 20.

When the microcomputer 20 disables the backup battery 50, the backup battery controller 42 forcibly interrupts the connection between the backup battery 50 and the switch 41, and when the microcomputer 20 enables the backup battery 50, the backup battery controller 42 connects the backup battery 50 and the switch 41.

When the main battery 60 does not supply the power, the backup battery 50 provides the power to the eCall system. The backup battery 50 is initially in the disable state and does not operate until the backup battery 50 is in the enable state. The backup battery 50 does not operate even in the state in which the main battery 60 does not supply the power to the eCall system.

The main battery 60 and the vehicle are separately transported to a sales area. The main battery 60 is mounted in the vehicle when they arrive at the sales area and connected to the eCall system, thereby supplying the power to the eCall system.

Figure 3:
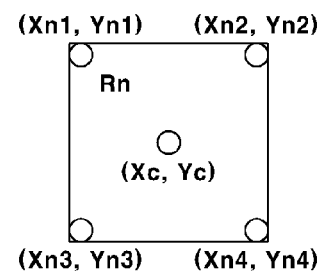
FIG. 3 is a diagram for describing a configuration of a sales area information database according to an exemplary embodiment of the present disclosure and illustrating an example of a region setting of a sales area.

Referring to FIG. 3, a configuration of the sales area information database will be described. The microcomputer 20 divides a region including all the sales areas, in which a vehicle (or vehicle model) is sold, into N number of regions and sequentially sets a first sales area, a second sales area, . . . , an N-th sales area depending on GPS information (position information) on each of the regions and then generates the sales area information representing the regions (ranges) and boundaries of each of the sales areas.

FIG. 3 illustrates an example of the sales area in which a vehicle (or vehicle model) is sold. All sales areas are divided into 6 regions, and each of the sales areas Rn is set as a first sales area R1, a second sales area R2, a third sales area R3, a fourth sales area R4, a fifth sales area R5, and a sixth sales area R6. To efficiently determine whether the current vehicle position is included in the sales area based on the sales area information generated by the microcomputer 20, each of the sales areas may be divided into a quadrangular or circular shape and may be set to overlap each other, so that there is no missing area in the sales areas.

When each of the sales areas is divided into the quadrangular shape, the position and boundary information (sales area information) of the sales areas may be represented by GPS coordinates of central points and the boundaries. When the sales areas are divided into the circular shape, the position information of the sales areas may be represented by the GPS coordinates (information) and radius values of the central points.

In particular, when the sales areas are divided into the quadrangular shape, the boundaries may be represented by the GPS coordinates of all corners (four corners) of the sales areas. That is, as illustrated in FIG. 3, in the position information of the each sales area, a central point may be represented by "(Xc, Yc)" which represents a latitude and a longitude, and a boundary Ln may be represented by "{(Xn1, Yn1), (Xn2, Yn2), (Xn3, Yn3), (Xn4, Yn4)}" as coordinates {Pn1, Pn2, Pn3, Pn4} of each corner. This is further described below.

$$\text{Sales area information} = \{\text{Central point}(Cn), \text{Boundary}(Ln)\}$$

$$\text{Central point}(Cn) = (Xc, Yc)$$

$$\begin{aligned}\text{Boundary}(Ln) &= \{Pn1, Pn2, Pn3, Pn4\} \\ &= \{(Xn1, Yn1), (Xn2, Yn2), (Xn3, Yn3), (Xn4, Yn4)\}\end{aligned}$$

The sales area information represented by the central point Cn, and the boundary Ln represents the central coordinates and the boundary coordinates of each of the sales areas. In particular, the boundary Ln may be used as the boundary information on a single sales area.

The sales area information database stored in the sales area information storage 30 is configured of each of the sales area information on a plurality of sales areas which are formed by dividing the whole region including all the sales areas into the N number of regions. The microcomputer 20 compares the position information (sales area information) of the corresponding sales area with the current position information of the vehicle when the vehicle arrives at the sales area set as a final destination of the vehicle among the plurality of sales areas to determine whether the current position of the vehicle is in the corresponding sales area.

Figure 4:
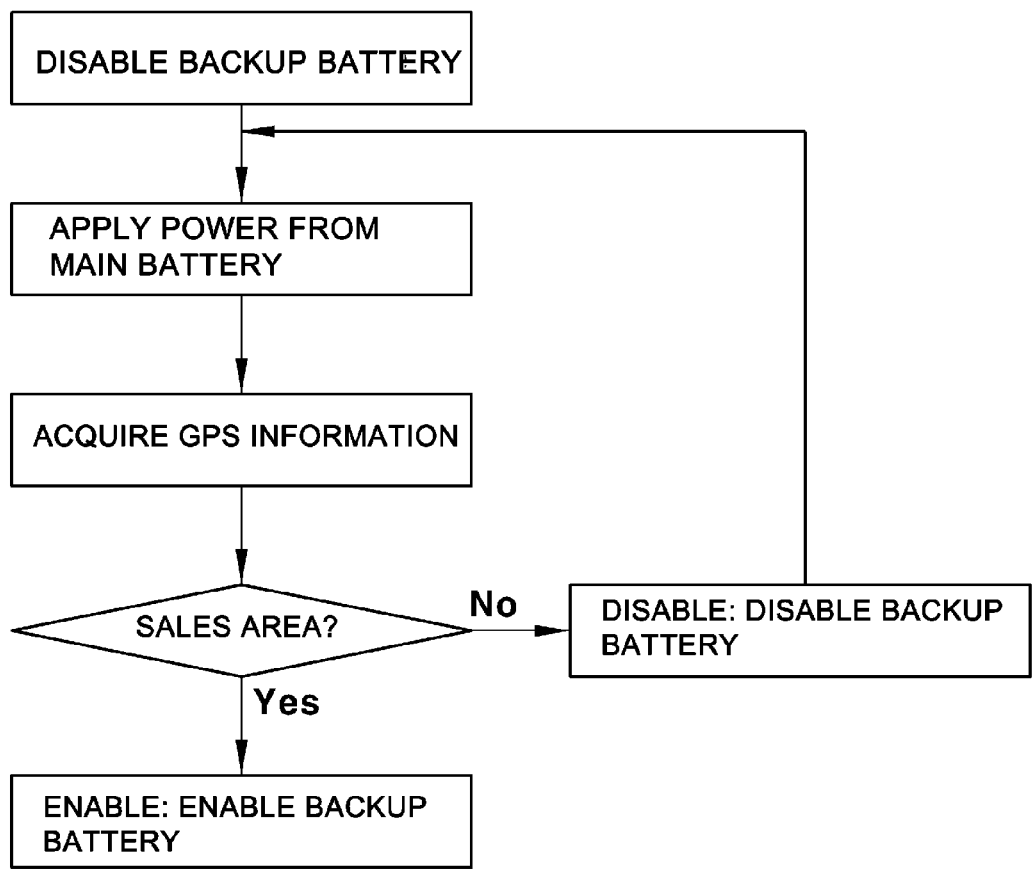
FIG. 4 is a diagram for describing a method for preventing an eCall system backup battery for a vehicle from discharging according to an exemplary embodiment of the present disclosure.

Hereinafter, a control process for preventing the backup battery from unnecessarily discharging will be described with reference to FIG. 4. As illustrated in FIG. 4, the backup battery 50 is initially in a disable state. That is, the backup battery 50 of the eCall system mounted in the vehicle maintains the disable state before the vehicle arrives at the sales area set as a final destination.

When the microcomputer 20 recognizes that the main battery is mounted in the vehicle to supply the battery power to the eCall system, the microcomputer 20 acquires the current position information (GPS information) of the vehicle from the GPS 10 and acquires the sales area information of the final destination, at which the vehicle arrives, from the sales area information storage 30.

The microcomputer 20 compares the current position information of the vehicle acquired from the GPS 10 with the sales area information of the final destination acquired from the sales area information storage 30 to determine whether the vehicle arrives at the sales area. In other words, the microcomputer 20 compares the current position information of the vehicle with the sales area information on the sales area set as the final destination of the vehicle to determine whether the vehicle is located within the final destination.

When the microcomputer 20 determines that the vehicle arrives at the final destination, the microcomputer 20 maintains the backup battery 50 to be in the enable state in which the backup battery 50 operates. When the microcomputer 20 determines that the vehicle does not arrive at the final destination, the microcomputer 20 maintains the backup battery 50 to be in the disable state in which the backup battery 50 does not operate. In other words, the microcomputer 20 automatically enables the backup battery 50 when the vehicle arrives at the final destination, thereby normally operating the eCall system even when the power from the main battery 60 is not supplied.

The microcomputer 20 informs the user when the power from the main battery 60 is not supplied, and the backup battery 50 is in the disable state by turning on the LED 70 (see FIG. 2).

The microcomputer 20 recognizes operation signals of operation buttons 81 and 82 when the user presses each of the operation buttons 81 and 82 (FIG. 2) for manually operating or testing the eCall system, thereby operating the eCall system. Further, the microcomputer 20 prevents a mute button 90 and the like from being operated when the eCall system is operated, such that the user is aware of the operation of the eCall system via a speaker or the like.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A device for preventing an emergency call (eCall) system backup battery for a vehicle from discharging, the device comprising:
    a global positioning system (GPS) configured to provide current position information of the vehicle in which an eCall system is mounted;
    a sales area information storage configured to form and store the GPS information on all sales areas as a sales area information database;
    a microcomputer configured to determine whether the vehicle is located within a sales area which is a final destination by using the information acquired from the GPS and the sales area information storage and to control whether the backup battery operates depending on the determination result, wherein the microcomputer is configured to prevent the backup battery from being operated while the vehicle is delivered to the sales area; and
    a power supply manager configured to select and manage any one of a main battery and the backup battery to supply power to the eCall system by a control of the microcomputer when the vehicle is located within the sales area.

2. The device of claim 1, wherein when the vehicle is located within the sales area which is the final destination, the microcomputer controls the backup battery of the eCall system to be in an operable state.

3. The device of claim 1, wherein when the vehicle is not located within the sales area which is the final destination, the microcomputer maintains the backup battery of the eCall system to be in an inoperable state even though the main battery is in an operable state.

4. The device of claim 1, wherein the power supply manager is configured of a switch which connects any one of the main battery and the backup battery to the eCall system by the control of the microcomputer.

5. The device of claim 1, wherein the power supply manager comprises a switch which connects any one of the main battery and the backup battery to the eCall system by the control of the microcomputer and a backup battery controller which forcibly interrupts the connection between the backup battery and the switch by the control of the microcomputer.

6. The device of claim 1, wherein the sales area information database is configured of each sales area information on a plurality of sales areas which are formed by dividing the whole region including all the sales areas into N number of regions.

7. The device of claim 1, wherein the sales area information database is configured of each sales area information on a plurality of sales areas which are formed by dividing the whole region including all the sales areas into N number of regions and the respective sales area information includes the GPS information on central points and all corners of each sales area which is divided into a quadrangular shape.

8. The device of claim 1, wherein the sales area information database is configured of each sales area information on a plurality of sales areas which are formed by dividing the whole region including all the sales areas into N number of regions and the respective sales area information includes the GPS information and radius values on central points of each sales areas which is divided into a circular shape.

9. The device of claim 1, wherein the microcomputer is configured to automatically enable the backup battery when the vehicle arrives at the sales area, thereby normally operating the eCall system even when the power from the main battery is not supplied.

10. A method for preventing an eCall system backup battery for a vehicle from discharging, comprising steps of:
    determining whether power from a main battery is supplied;
    acquiring current position information of the vehicle and sales area information on a final destination of the vehicle when it is recognized that the power from the main battery is supplied;
    determining whether the vehicle is located within a sales area based on a comparison result of the acquired current position information of the vehicle with the sales area information on the final destination of the vehicle; and
    controlling the backup battery of the eCall system to prevent the backup battery from being operated while the vehicle is delivered to the sales area and controlling the backup battery of the eCall system to be in an operable state when the vehicle is located within the sales area which is the final destination.

11. The method of claim 10, wherein when the vehicle is not located within the sales area which is the final destination, the microcomputer maintains the backup battery of the eCall system to be in an inoperable state even though the main battery is in an operable state.

12. The method of claim 10, wherein in the step of acquiring, the sales area information on the final destination of the vehicle is acquired from a sales area information database and the sales area information database is configured of each sales area information on a plurality of sales areas which are formed by dividing the whole region including all the sales areas into N number of regions.

13. The method of claim 12, wherein the sales area information database is configured of each sales area information on the plurality of sales areas which are formed by dividing the whole region including all the sales areas into the N number of regions and the respective sales area information includes GPS information on central points and all corners of each the sales area which is divided into a quadrangular shape.

14. The method of claim 12, wherein the sales area information database is configured of each sales area information on a plurality of sales areas which are formed by dividing the whole region including all the sales areas into N predetermined regions and the respective sales area information includes GPS information and radius values on central points of each of the sales areas which is divided into a circular shape.

15. The method of claim 10, wherein the backup battery supplies the power to the eCall system when the main battery does not supply the power to the eCall system and is initially set in an inoperable state.

* * * * *